US012388326B2

(12) United States Patent
Vanhee et al.

(10) Patent No.: US 12,388,326 B2
(45) Date of Patent: Aug. 12, 2025

(54) ELECTRIC MACHINE WITH A COOLING ASSEMBLY

(71) Applicant: Dana Automotive Systems Group, LLC, Maumee, OH (US)

(72) Inventors: Steven Vanhee, Hooglede (BE); Joachim Druant, Houthulst (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 272 days.

(21) Appl. No.: 18/060,508

(22) Filed: Nov. 30, 2022

(65) Prior Publication Data

US 2024/0178724 A1 May 30, 2024

(51) Int. Cl.
*H02K 1/20* (2006.01)
*H02K 3/24* (2006.01)
*H02K 9/193* (2006.01)

(52) U.S. Cl.
CPC ............. *H02K 9/193* (2013.01); *H02K 1/20* (2013.01); *H02K 3/24* (2013.01)

(58) Field of Classification Search
CPC .. H02K 1/20; H02K 3/24; H02K 3/32; H02K 3/325; H02K 3/34; H02K 3/345; H02K 5/20; H02K 5/203; H02K 9/19; H02K 9/193
See application file for complete search history.

(56) References Cited

U.S. PATENT DOCUMENTS

| | | | |
|---|---|---|---|
| 2021/0044172 A1 | 2/2021 | Hombsch et al. | |
| 2021/0075288 A1* | 3/2021 | Weber | H02K 15/12 |
| 2022/0014067 A1 | 1/2022 | Wittmann et al. | |
| 2022/0348063 A1* | 11/2022 | Trudel | H02K 7/006 |
| 2023/0318370 A1* | 10/2023 | Liu | H02K 5/203 |
| | | | 310/59 |
| 2024/0313621 A1* | 9/2024 | Gloede | H02K 9/19 |

FOREIGN PATENT DOCUMENTS

| | | | | |
|---|---|---|---|---|
| CN | 112104116 A | * | 12/2020 | |
| CN | 112615445 A | * | 4/2021 | H02K 1/20 |
| CN | 217769761 U | * | 11/2022 | H02K 9/00 |

OTHER PUBLICATIONS

Ouyang, Machine Translation of CN112104116, Dec. 2020 (Year: 2020).*
Liu, Machine Translation of CN217769761, Nov. 2022 (Year: 2022).*

* cited by examiner

*Primary Examiner* — Eric Johnson
(74) *Attorney, Agent, or Firm* — McCoy Russell LLP (57) ABSTRACT

Methods and systems for an electric machine. The electric machine includes, in one example, a stator with end windings and a stator core and a cooling assembly with a spray ring that is directly coupled to an axial face of the stator core. In the electric machine, the spray ring is configured to spray a coolant at the end windings and includes a first section that extends down the axial face of the stator core and a second section that extends axially away from the stator core.

16 Claims, 3 Drawing Sheets

ELECTRIC MACHINE WITH A COOLING ASSEMBLY

TECHNICAL FIELD

The present disclosure relates to an electric machine with spray rings that direct coolant through stator end windings.

BACKGROUND AND SUMMARY

In electric motors, such as electric motors in electric vehicle (EV) applications, cooling systems has been used in an attempt to achieve greater motor efficiency. For instance, oil may be directed onto stator end windings to increase motor efficiency. However, the flow pattern in the end winding cavity may not achieve a targeted amount of end winding cooling in certain motor designs.

US 2021/0044172 A1 Hombsch et al. teaches an electric motor with a cooling jacket that circulates oil around an outer surface of a stator and an inner surface of the cooling jacket. Hombsch's motor further includes a ring that is coupled to the stator via a seal and an orifice that attempts to direct oil at the end windings.

The inventors have recognized several issues with Hombsch's motor as well as other previous motor. For instance, the use of the seal to connect the spray ring to the stator in Hombsch's motor, decreases the compactness of the motor and increases the complexity of the motor which can lead to a lengthy assembly process. Previous spray rings have been constructed from aluminum. When aluminum spray rings are used, creepage distances should be respected, thereby constraining the location of the jet.

To overcome at least some of the abovementioned issues the inventors developed an electric machine. The electric machine includes, in one example, a stator with end windings and a stator core. The electric machine further includes a cooling assembly with a spray ring that is directly coupled (e.g., bonded) to an axial face of the stator core. In such an example, the spray ring sprays a coolant at the end windings. The spray ring includes a first section that extends down the axial face of the stator core and a second section that extends axially away from the stator core. Shaping the spray ring in this manner enables a greater amount of coolant to flow through the end windings, thereby increasing stator cooling and machine efficiency as a consequence. Further, shaping the spray ring in this manner, significantly simplifies the assembly process. Further, the spray ring enhances sealing with the stator face due to the large planer contact area between the spray ring and the stator core.

Further, in one example, the stator end windings may be hairpin end windings. The use of the hairpin end windings in conjunction with the L-shaped spray ring allows the compactness and efficiency of the machine to be increased, if desired. To elaborate, the hairpin end windings allows the power density of the machine to be increased, in comparison to a machine with round end windings, for instance.

Still further, in one example, the spray ring may be coupled to a stack of laminations in the stator using bonding and impregnation of the ring onto the lamination stack. Consequently, the space efficiency of the end winding assembly may be further increased and the longevity of the machine may be increased, when compared to machines which attach a spray ring to the stator via a seal.

Further, in one example, the spring ring may include a third section that extends axially away from the stator core. In such an example, the third section may be positioned at an inner diameter of the spray ring. The third section of the spray ring may shield coolant spray from the rotational airflow originating from the rotor and, therefore, increases the effectiveness of the cooling methodology.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric machine, is described herein, that includes a cooling assembly that effectively cools stator end windings to a greater extent than previous motor cooling systems. To achieve the end winding cooling, the electric machine includes a spray ring that has an "L" or "C" type shape which generates a coolant flow in the end winding cavity that directs a greater portion of the coolant directly through the end windings to remove more heat from the windings when compared to other cooling systems. As a result, machine efficiency is increased, thereby increasing machine appeal. Still further, the end windings may specifically be hairpin style end windings to enable the power density of the machine to be increased, if desired. The spray ring may further include a section at an inner diameter that axially extends outward from the stator's core. This spray ring section shields coolant spray from the rotational airflow originating from the rotor and, therefore, increases the effectiveness of the cooling methodology.

Figure 1:
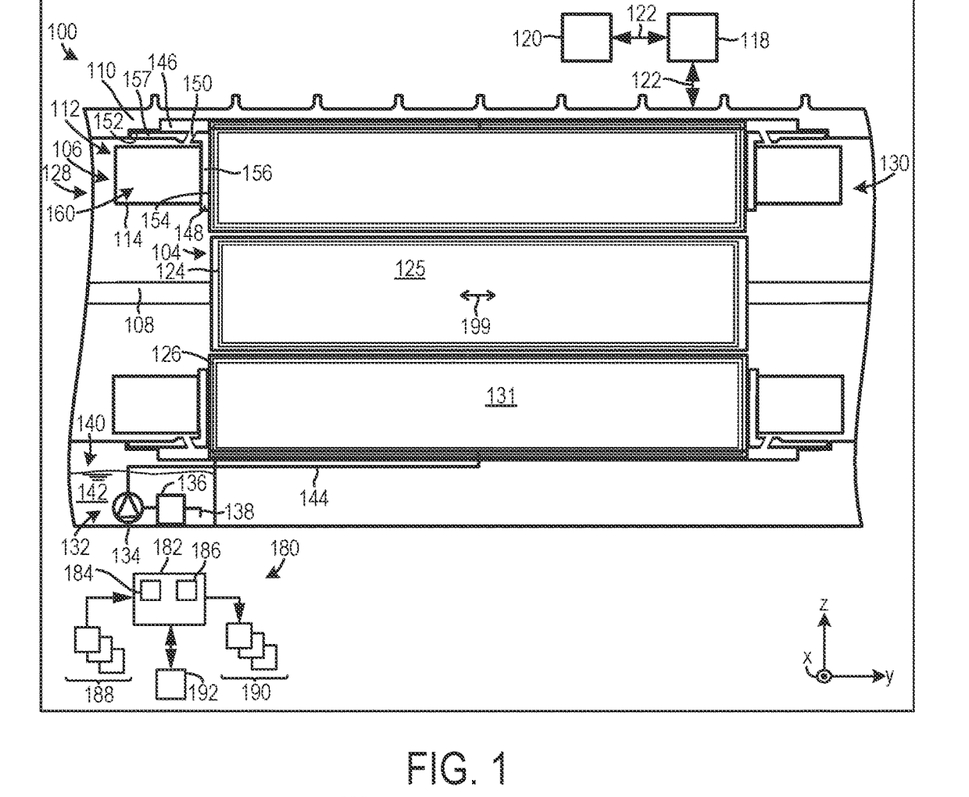
FIG. 1 shows a cross-sectional view of an example of an electric machine with a cooling assembly.
Figure 2A:
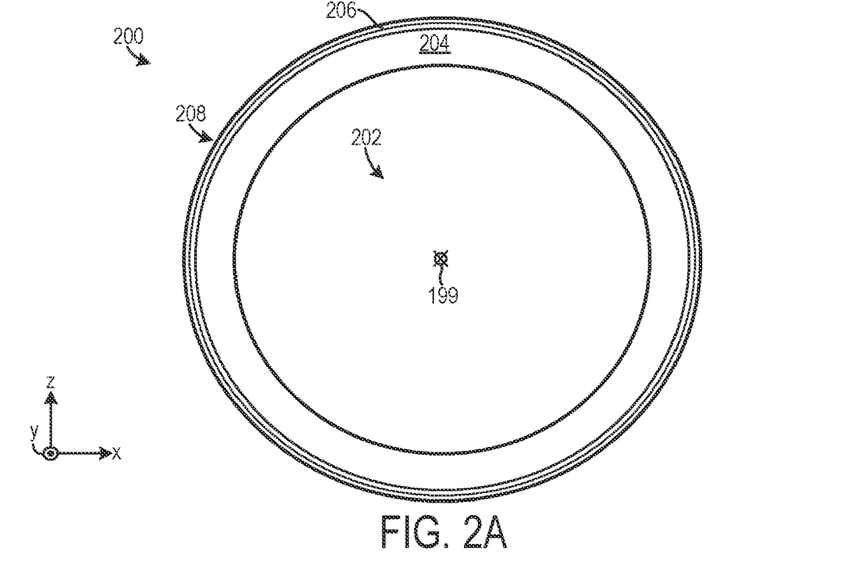
FIGS. 2A-2B show detailed front and rear views of an example of a spray ring in an electric machine cooling assembly.
Figure 2B:
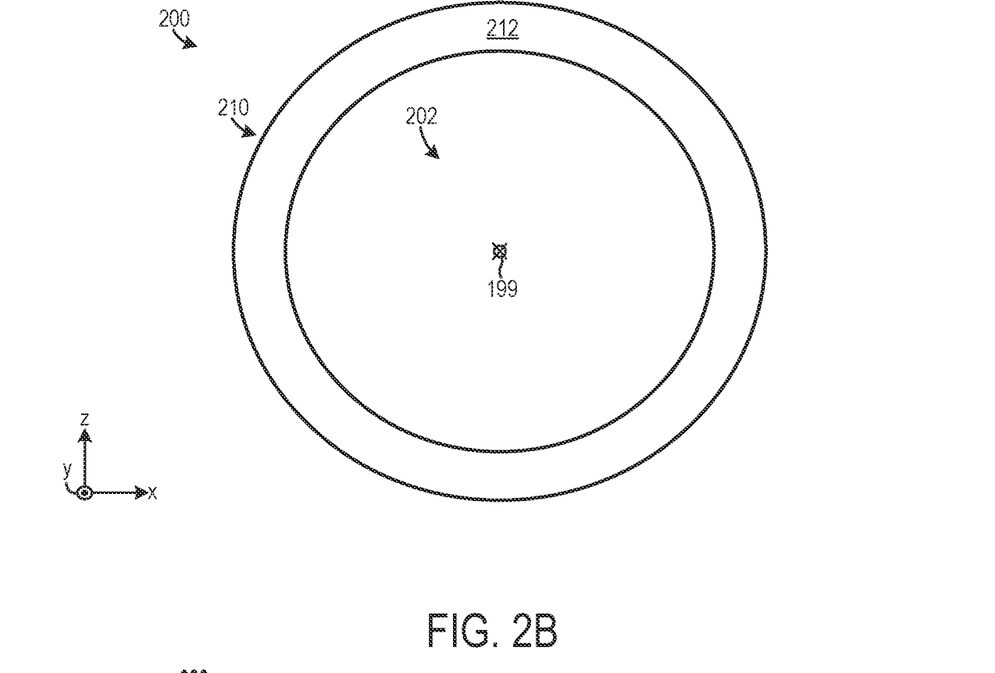
Figure 3:
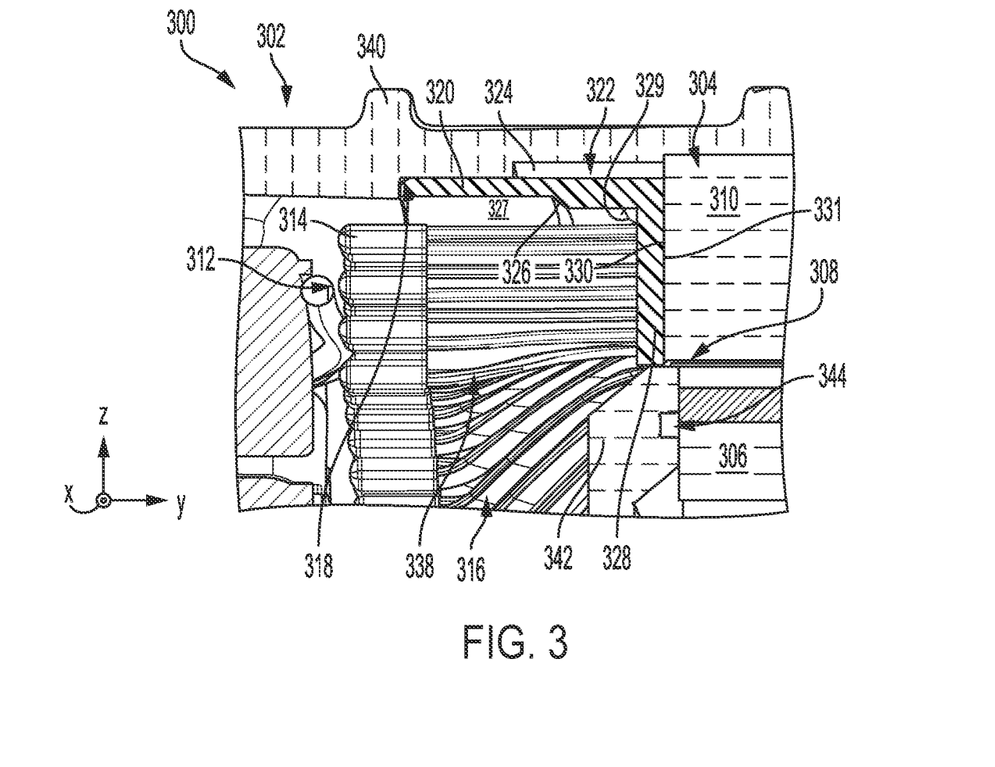
FIG. 3 shows a detailed view of an example of a stator end winding cooling assembly.
Figure 4:
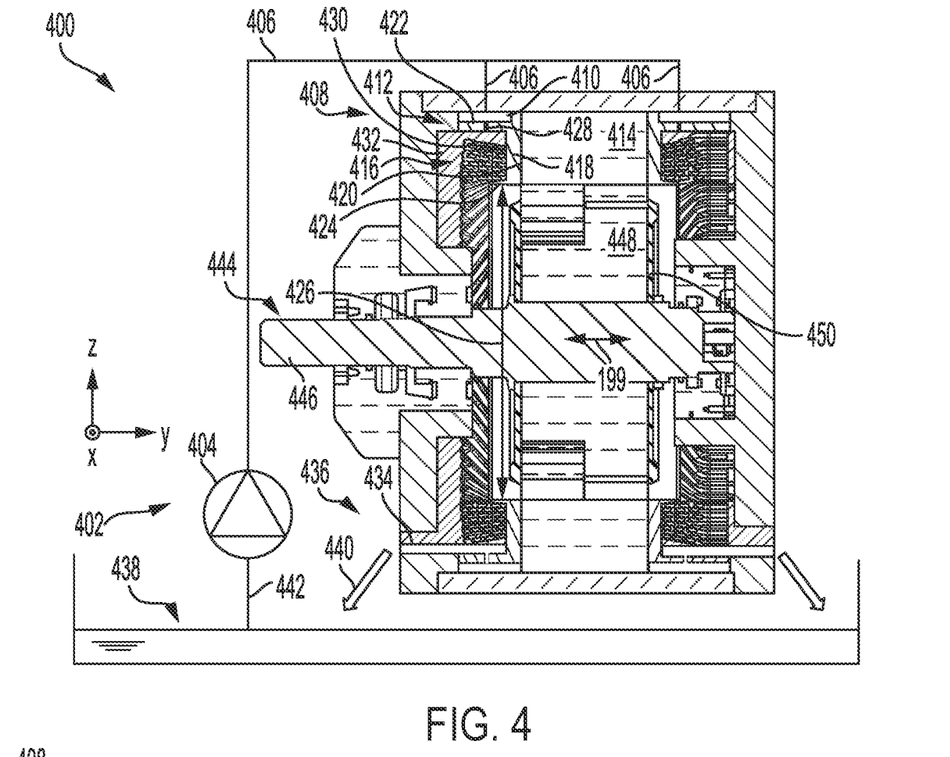
FIG. 4 shows a cross-sectional view of another example of an electric machine with a cooling assembly.
Figure 5:
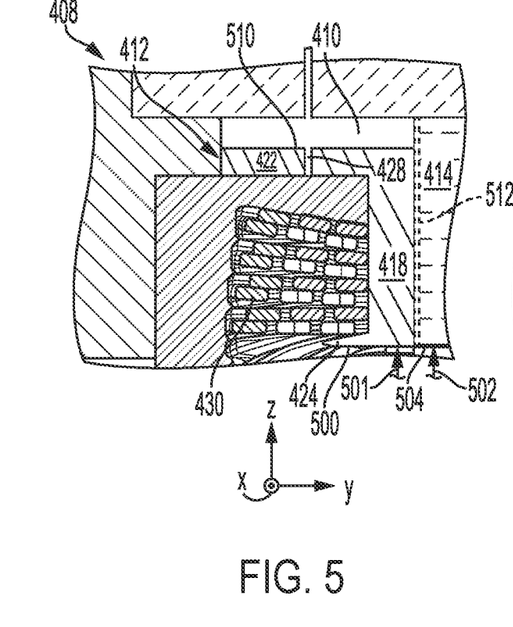
FIG. 5 shows a detailed view of a section of the electric machine, depicted in FIG. 4.
Figure 6:
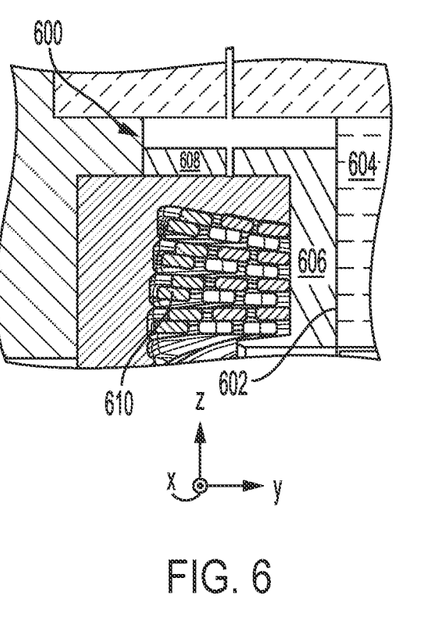
FIG. 6 shows another example of a spray ring in a cooling assembly for an electric machine.

FIG. 1 shows an example of an electric machine with a cooling assembly that includes an L-shaped spray ring that strategically directs a greater amount of coolant through the stator's end windings than other machine cooling systems. FIGS. 2A-2B show front and rear views of an example of the L-shaped spray ring that alter the coolant flow dynamics in the end winding cavity to increase stator cooling. FIG. 3 shows a detailed illustration of another example of stator assembly in an electric machine which increases the amount of heat removed from the end windings, thereby increasing motor efficiency. FIG. 4 shows another example of an electric machine with a cooling assembly. FIG. 5 shows a detailed view a spray ring in the cooling assembly, depicted in FIG. 4. FIG. 6 shows another example of a spray ring for an electric machine cooling assembly.

FIG. 1 shows an illustration of an electric machine 100. The electric machine 100 may be designed as an electric motor-generator and may be included in a system 102 which may take a variety forms. For instance, the electric machine 100 may be incorporated into an electric drive of an electric vehicle (EV). In the EV example, the EV may be an all-electric vehicle (e.g., a battery electric vehicle (BEV)), in one example, or a hybrid electric vehicle (HEV), in another example. For instance, the electric machine may be mechanically coupled to a transmission (e.g., gearbox) that is coupled to drive wheels using one or more differentials for example. Further, in the EV example, the electric machine may be a traction motor that delivers mechanical power to drive wheels. In the HEV example, the electric machine may be included in an electric axle, and an internal combustion engine may provide motive power to another drive axle. However, the motor may be used in other suitable systems (e.g., stationary systems), in other examples, such as in industrial machines, agricultural systems, mining systems, and the like.

The electric machine 100 includes a rotor 104 that electromagnetically interacts with a stator 106 to drive rotation of a rotor shaft 108 that is included in the rotor. The stator 106 at least partially surrounds the rotor 104. As such, the electric machine 100 may be a radial flux style motor.

The electric machine 100 in the illustrated example includes a housing 110. The housing 110 may form an enclosure (e.g., a sealed enclosure) 112 that contains stator end windings 114, cooling assembly components, and the like, which are expanded upon herein. The housing may include an electrical interface. The electrical interface may be a multi-phase electrical interface with multiple electrical connectors. The electrical interface may be three-phase interface in one example or a six or nine phase interface, in other examples. More generally, the electric machine 100 may be a multi-phase alternating current (AC) machine. However, in other examples, the electric machine 100 may be a direct current (DC) machine.

As illustrated in FIG. 1, the electric machine 100 may be electrically coupled to an inverter 118. The inverter 118 is designed to convert direct current (DC) power to alternating current (AC) power and vice versa. As such, the electric machine 100 may be an AC electric machine, as indicated above. However, in other examples, the electric machine 100 may be a DC electric machine (as previously indicated), and the inverter 118 may therefore be omitted from the system 102. The inverter 118 may receive electric energy from one or more energy storage device(s) 120 (e.g., traction batteries, capacitors, combinations thereof, and the like). Arrows 122 signify the electric energy transfer between the electric machine 100, the inverter 118, and the energy storage device(s) 118 that may occur during different modes of system operation.

The rotor 104 may include a core 124 that includes a stack of laminations 125. In the stack, laminations that may be formed of a metal (e.g., steel, aluminum, combinations thereof, and the like) are sequentially arranged and coupled (e.g., bonded and/or welded) to one another. Further, the rotor lamination stack may include teeth.

Continuing with FIG. 1, the stator 106 may include a core 126 through which windings extend. These windings protrude from the stator core on either axial end to form the end windings 114. The end windings may be positioned on opposing axial sides 128 and 130 of the electric machine.

The stator core 126 may include a stack of laminations 131 which may include teeth and gaps at an inner periphery. It will be understood that the stack of stator laminations may have openings through which the windings extends. The stator lamination stack includes multiple metal (e.g., steel, aluminum, combinations thereof, and the like) sheets that are sequentially arranged and may be stacked, welded, or bonded together, in different instances.

The stator core 126 and end windings 114 are schematically illustrated in FIG. 1. However, it will be understood that they have greater structural complexity that is expanded upon herein. The end windings 114 may be hairpin end windings, in one example, which allows the power density of the motor to be increased, when compared to other types of end windings such as end windings with round cross-sections. A hairpin end winding is defined herein as an end winding with wires that have a rectangular cross-section which are referred to as flat wires. In other examples, end windings with round cross-sections may be used in the electric machine 100 which may however decrease the machine's power density.

The end windings 114 generate heat during machine use. As such, cooling of the end windings to increase motor efficiency may be desired. A cooling assembly 132 is provided to remove heat from the end windings 114.

The cooling assembly 132 in the illustrated example, includes a coolant pump 134 and a filter 136 that includes a pick-up 138 in a sump 140. The sump 140 is positioned in an internal enclosure of the electric machine 100 and is contoured to collect coolant 142 that is sprayed at the end windings 114. The coolant used in the cooling assembly 132 may specifically be oil (e.g., natural and/or synthetic oil), in one example. However, other suitable types of coolant have been contemplated. The pump 134 and filter 136 are incorporated into the electric machine 100 in the illustrated example. However, in other examples, the pump and/or filter may be spaced away from the machine's housing or externally coupled thereto. The location of the pump may be selected based on the machine's end-use packaging constraints, for instance.

To direct coolant towards the end windings, the cooling assembly 132 may include coolant conduits 144. The coolant conduits 144 may extend through the stator 106 and specifically the stator core 126. Additionally or alternatively, the coolant conduits 144 may extend through the housing 110. To elaborate, in other cooling assembly designs, the coolant may be routed through the housing 110 into cavities 146 in the housing 110.

Further, the coolant conduits 144 may each open into one of the cavities 146 that is arranged between an associated spray ring 148 and the housing 110. However, alternative coolant routing schemes may be used in other examples. For instance, the coolant conduits may include outlets that are in direct fluidic communication with coolant openings 150 in the spray rings 148.

In the illustrated example, the housing 110 includes recesses 152 in which a portion of the spray rings 148 resides. In this way, the spray rings 148 may be effectively incorporated into the housing 110. However, other housing profiles have been contemplated.

The electric machine 100 includes multiple spray rings 148. To elaborate, in the illustrated example, the electric machine 100 includes a pair of spray rings, the first spray ring positioned on the first axial side 128 of the machine and the second spray ring positioned on the second axial side 130 of the machine. The spray rings 148 may have an annular shape to enable the rotor shaft 108 to pass therethrough.

The spray rings 148 that are directly coupled to the stator 106. To elaborate, the spray rings 148 are each coupled to an axial face 154 of the stator core 126. For instance, the spray rings 148 may each be bonded and/or impregnated to an outer lamination in the stack of stator laminations 131. For instance, the spray rings may be adhesively bonded to the outer lamination in the stack.

Each of the spray rings 148 include a first section 156 that extends down the axial face 154 of the stator 106 (e.g., the stack of stator laminations 131 in the stator core 126) are is coupled thereto. Each of the spray rings 148 further includes a second section 157 that extend axially away from the stator core 126. Thus, the profile of the spray rings in radial cross-section have is L-shaped. Designing the spray rings with L-shaped profiles enables a coolant flow pattern to be achieved in which a greater amount of heat is extracted from the end windings.

The spray rings 148 each may further include the coolant opening 150 (e.g., spray channels). The openings 150 receive coolant from the cavities 146 in the housing 110 that is in fluidic communication with the coolant conduits 144. However, as previously indicated, the coolant conduits 144 may be in direct fluidic communication with the openings 150.

The system 102 may additionally include a control subsystem 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the system 102. The sensors 188 may include an electric machine speed sensor, energy storage device temperature sensor(s), an energy storage device state of charge sensor(s), an inverter power sensor, and the like. The controller 182 may also send control signals to various actuators 190 coupled at different locations in the system 102. For instance, the controller may send signals to the inverter 118 to adjust the rotational speed of the electric machine 100. In another example, the controller 182 may send a command signal to the electric machine 100 and/or the inverter 118 and in response motor speed may be adjusted. The other controllable components in the system 102 may function in a similar manner with regard to command signals and actuator adjustment.

The system 102 may also include one or more input device(s) 192 (e.g., an accelerator pedal, a brake pedal, a console instrument panel, a touch interface, a touch panel, a keyboard, combinations thereof, and the like). The input device(s) 192, responsive to user input, may generate a motor speed adjustment request.

An axis system is provided in FIG. 1, as well as FIGS. 2A-6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 199 of the electric machine 100 is further provided for reference in FIG. 1 as well as FIGS. 2A-2B and 4. Cutting planes for the cross-sectional views shown in FIGS. 1, 3, and 4-6 extend through the rotational axes 199.

FIGS. 2A-2B show respectively front and rear views of an example of a spray ring 200. The spray ring 200 may be an example of the spray rings 148 included in the electric machine 100 shown in FIG. 1 and/or the other electric machines described herein. The spray ring 200 may have an annular shape with a central opening 202 which allows the rotor shaft to extend therethrough.

FIG. 2A shows a first section 204 and a second section 206 of the spray ring 200 on an outer side 208. The outer side of the spray ring may be in the enclosure in which the end windings are positioned, when the ring is installed in the machine. When assembled the first section 204 extends down an axial face of the stator core and the second section 206 extends axially away from the stator core (which is in the direction out of the page in the frame of reference depicted in FIG. 2A), as indicated above. The first and second sections 204 and 206 of the spray ring may form a continuous structure (e.g., a monolithic structure), in one example. For instance, the first and second sections of the spray ring may be manufactured by machining a single piece of material. For instance, the spray ring may be injection molded or manufacturing using other suitable techniques. However, in other examples, the sections of the spray ring may be separately manufactured and then attached to one another via adhesive bonding, interference fitting, combinations thereof, and the like. It will be appreciated that the first section 204 may include openings through which the end windings pass.

FIG. 2B shows the rear side 210 of the spray ring 200 with a surface 212 that may be in face sharing contact with the axial face of the stator core when the spray ring is installed in the electric machine. To elaborate, the surface 212 of the spray ring may be bonded (e.g., bonded and impregnated) onto an outer lamination in the stack of stator laminations of the stator core. In this way, the space efficiency of the machine may be increased.

FIG. 3 shows an example of an electric machine 300. The electric machine 300 shown in FIG. 3 as well as the other machines described herein may have at least a portion of the structural and/or functional features of the electric machine 100 shown in FIG. 1 and vice versa.

The electric machine 300 includes a housing 302, a stator 304, and a rotor 306. An air gap 308 is formed between the stator 304 and the rotor 306. The stator 304 includes a core 310 and end windings 312 that extend axially outward from the core. The end windings 114 are depicted as hairpin type end windings in the illustrated embodiment. However, it will be understood, that the end windings may have a round cross-section, as previously indicated.

The end windings 312 may be demarcated into different sections. For instance, the end windings 312 include tips 314 and intermediary sections 316. The tips 314 may extend in an axial direction while the intermediary sections may extend in both axial and radial directions. However, other contours of the end winding sections may be used in other examples.

The housing 302 is shown including a recess 318 shaped and sized to receive a portion of a section 320 of a spray ring 322. In this way, the compactness of the machine may be increased. However, other housing profiles may be used, in other embodiments. The housing 302 further forms a compartment 324 that may receive coolant from a cooling assembly, such as the cooling assembly 132 depicted in FIG. 1. The section 320 of the spray ring 322 extends axially away from the stator core 310. The section 320 may include an interior surface 326 that is stepped to generate a coolant flow pattern that is conducive to increasing stator end winding cooling. A coolant cavity 327 is formed radially inward from the interior surface 326. Coolant in the cavity 327 is directed through the end windings 312 to increase heat removal therefrom.

Another section 328 of the spray ring 322 extends down the axial face 330 of the stator core 310. The sections 322 and 328 of the spray ring 322 form and angle 329 with one another. The angle may be approximately 90° in one example. However, more generally the angle 329 may be less than or equal to 90°, in certain embodiments.

Specifically, an inner surface 331 of the spray ring section 328 may be in face sharing contact with the axial face 330 of the core 310. To elaborate, the surface 331 of the spray ring section 328 may be bonded and impregnated (e.g., adhesively bonded and impregnated) to the axial face 330 of the stator core. In the illustrated example, a seal (e.g., an O-ring seal) between the spray ring and the stator core end face is omitted to increase machine compactness. However, a seal may be used to couple the spray ring to the stator, in other examples, which may come at the expense of machine compactness.

The section 328 of the spray ring 322 allows the electric machine 300 to achieve a desired amount of insulative properties with regard to the stator core 310, while also increasing the amount of coolant that is directed between the end windings 312. To elaborate, the section 328 insulates the end windings 312 from the stator iron.

The housing 302 may include extensions 340 that function as heat fins to further increase electric machine cooling and consequently increase machine efficiency. However, in other examples, the extensions may be omitted from the machine.

In one example, the electric machine may forego a water jacket that surrounds the housing due to the level of end winding cooling achieved by the spray ring arrangement. However, the electric machine 300 may include a water jacket that at least partially surrounds the housing and circulates coolant therethrough, in other examples. In such an example, the coolant may be a mixture of water and glycol or oil, for instance.

A balancing plate 342 may be coupled to the rotor 306 via a sealing interface 344. The balancing plate 342 allows rotational imbalances in the rotor to be reduced. As a result, the likelihood of machine degradation is reduced.

FIG. 4 shows another example of an electric machine 400. The electric machine 400 again includes a cooling assembly 402 with a pump 404 and coolant conduits 406 (e.g., coolant lines) that direct coolant into selected areas of the machine. In the illustrated example, the coolant conduits 406 route coolant through a housing 408 directly into coolant compartments 410 which are adjacent to spray rings 412. To elaborate, the coolant compartments 410 may be positioned adjacent to an outer diameter of the spray rings. The spray rings 412 are positioned on opposing axial sides the machine and are directly coupled to (e.g., bonded to) a stator core 414 of a stator 416. Thus, in the cooling assembly architecture depicted in FIG. 4, coolant is not routed through the stator core. However, as previously indicated cooling assemblies with stator core coolant routing has been contemplated.

The spray rings 412 again each include a first section 418 that extends down an axial face 420 of the stator core 414 and a second section 422 that extends axially away from the stator core. The second section 422 is positioned at or near an outer diameter of the spray ring. However, in the spray ring embodiment shown in FIG. 4, the spray rings 412 each include a third section 424 that extends axially away from the stator core at or near an inner diameter 426 of the spray ring.

A spray channels 428 may extend (e.g., radially extend) through the second sections 422 of the spray ring 412. The spray channels 428 direct coolant spray towards the end windings 430 of the stator 416 to remove heat therefrom and enhance stator cooling. A cavity 432 formed in the housing encloses the end windings 430. The housing 408 may further include coolant channels 434 in a lower section 436. Coolant may flow from the channels 434 into a sump 438 as indicated via arrows 440. In this way, coolant that has been used to cool the end windings returns to the sump. In the illustrated example, the coolant channels 434 extend axially outward through the housing. However, in other examples, the coolant channels 434 may extend both axially and radially downward to increase the coolant flowrate through the channels. The pump 404 may include a pick-up 442 in the sump 438 that allows a coolant loop to be formed in the machine. From the pump, coolant flows back to the lines 406.

FIG. 4 further shows a rotor 444 with a rotor shaft 446 and a rotor core 448 that has balancing plates 450 coupled to opposing sides of the rotor core. The balancing plates 450 may be contoured to reduce rotational imbalances in the machine.

FIG. 5 shows a detailed view of the end windings 430 and one of the spray rings 412 included in the electric machine 400, shown in FIG. 4. The first section 418, the second section 422 and the third section 424 of the spray ring are again shown which form "C" type shape. The third section 424 may shields coolant spray from the centrifugal airflow originating from the rotor and, therefore, increase the effectiveness of the cooling methodology in the electric machine. A surface 500 at the inner diameter of the spray ring may have radius 501 that is greater than or equal to an outer radius 502 of the air gap 504. In this way, the amount of coolant entering the air gap is reduced, thereby increasing machine efficiency due to the reduction in drag losses. The third section 424 of the spray ring may taper in a radially outward direction to allow the coolant to achieve a desired flow pattern which increases end winding cooling while reducing the amount of coolant that enters the air gap 504. Further, the second section 422 may have a greater axial length than the third section 424 to achieve a desired coolant flow around and through the end windings which increased coolant penetration into the end windings.

Further, the first section 418 of the spray ring may have a greater thickness than the second section 422 to allow the spray ring to generate a desired coolant flow pattern. However, other spray ring profiles have been envisioned.

Further, the coolant compartment 410 extends down the length of an outer surface 510 of the second section 422 of the spray ring 412, in the illustrated example. However, in other examples, the boundary of the coolant compartment may be decreased such that the compartment is arranged in a region closer to the spray channel 428, in other examples. FIG. 5 further shows a layer of adhesive 512 that may be used to bond the spray ring 412 to the stator core 414. However, other techniques for attachment between the spray ring and the stator core may be used, in other examples.

FIG. 6 shows another example of a spray ring 600. The spray ring 600 is again illustrated directly coupled to an axial end face 602 of a stator core 604. The spray ring 600 again includes a first section 606 and a second section 608 that form an "L" shape. The "L" shaped spray ring enables a greater amount of coolant to flow through the end windings 610.

The spray rings with the features described herein enable end winding cooling to be effectively increased using an assembly that is efficient to manufacture and install. The appeal of the machine is therefore increased.

FIGS. 1-6 provide for the following method for operation of an electric machine. The method includes spraying a coolant from a spray ring toward stator end windings. The method may further include, prior to the spraying step, flowing coolant through a passage that traverses the stator core. In this example the electric machine includes a cooling assembly with a spray ring that is directly coupled to an axial face of the stator core. Further, the spray ring is configured to spray a coolant at the end windings and includes a first section that extends down the axial face of the stator core and a second section that extends axially away from the stator core.

The technical effect of the method for electric machine operation is to increase machine efficiency by transferring greater amount of heat away from the end windings, when compared to other machine designs.

FIG. 3 is drawn approximately to scale. Although other relative component dimensions may be used, in other embodiments.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric machine is provided that comprises a stator including a plurality of end windings and a stator core; and a cooling assembly including a spray ring that is directly coupled to an axial face of the stator core, wherein the spray ring is configured to spray a coolant at the plurality of end windings and includes: a first section that extends down the axial face of the stator core; and a second section that extends axially away from the stator core.

In another aspect, a method for operating a cooling assembly in an electric machine is provided that comprises spraying a coolant from a spray ring toward a plurality of stator end windings; wherein the electric machine includes: a cooling assembly that includes the spray ring that is directly coupled to an axial face of the stator core, wherein the spray ring is configured to spray a coolant at the plurality of end windings and includes: a first section that extends down the axial face of the stator core; and a second section that extends axially away from the stator core. The method may further comprise, in one example, flowing coolant through a passage that traverses the stator core.

In yet another example, an electric motor is provided that comprises a stator including a plurality of hairpin end windings and a stator core; and a cooling assembly including a spray ring that is directly coupled to an axial face of the stator core, wherein the spray ring is configured to spray oil at the plurality of end windings and includes: a first section that extends down the axial face of the stator core; and a second section that extends axially away from the stator core.

In any of the aspects or combinations of the aspects, the coolant may include oil.

In any of the aspects or combinations of the aspects, the spray ring may be directly coupled to a stack of stator laminations in the stator core.

In any of the aspects or combinations of the aspects, the spray ring may be bonded and impregnated to the stack of stator laminations.

In any of the aspects or combinations of the aspects, the plurality of stator end windings may be hairpin end windings.

In any of the aspects or combinations of the aspects, the spray ring may include a coolant passage that extends through the second section.

In any of the aspects or combinations of the aspects, the electric machine may be a multi-phase electric machine.

In any of the aspects or combinations of the aspects, the electric machine may be a traction motor in an electric drive of a vehicle.

In any of the aspects or combinations of the aspects, the cooling assembly may include a sump configured to collect the coolant.

In any of the aspects or combinations of the aspects, the electric machine may further comprise a pump configured to receive coolant from the sump, wherein the pump is incorporated within the electric machine.

In any of the aspects or combinations of the aspects, the spray ring may be adhesively bonded to the stack of stator laminations.

In any of the aspects or combinations of the aspects, a portion of the second section of the spray ring may be incorporated into a recess of a housing.

In any of the aspects or combinations of the aspects, an interface between the spray ring and the stator core may not include a seal.

In any of the aspects or combinations of the aspects, the spray ring may include a third section that extends axially away from the stator core at an inner diameter of the spray ring.

In any of the aspects or combinations of the aspects, the third section may be positioned at an inner diameter of the spray ring.

In another representation, a stator assembly in an electric motor is provided that comprises a spray ring directly bonded to a peripheral surface of an outer stator lamination in a stack of stator laminations, wherein the spray ring is configured to spray oil towards hairpin end windings, wherein the spray ring is L-shaped and includes a section that at least partially circumferentially extends around the hairpin end windings.

As used herein, the term "approximately" is construed to mean plus or minus five percent of the range, unless otherwise specified.

Note that the example control and estimation routines included herein can be used with various motor configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or driveline control system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
a stator including a plurality of hairpin end windings and a stator core; and
a cooling assembly including a spray ring that is directly coupled to an axial face of the stator core, wherein the spray ring is configured to spray a coolant at the plurality of hairpin end windings and includes:
a first section that extends down the axial face of the stator core; and
a second section that extends axially away from the stator core;
wherein the second section includes an interior surface with a step that alters coolant flow;
wherein the step is positioned axially inward from a plurality of tips of the plurality of hairpin end windings;
wherein the spray ring is directly adhesively bonded to a stack of stator laminations;
wherein the second section is mated with a recess in a housing; and
wherein the housing includes a coolant compartment that is positioned radially outward from the step.

2. The electric machine of claim 1, wherein the spray ring includes a third section that extends axially away from the stator core.

3. The electric machine of claim 2, wherein the third section is positioned at an inner diameter of the spray ring.

4. The electric machine of claim 1, wherein the spray ring includes a coolant opening that extends through the second section.

5. The electric machine of claim 1, wherein the electric machine is a multi-phase electric machine.

6. The electric machine of claim 1, wherein the coolant is oil.

7. The electric machine of claim 1, wherein the electric machine is a traction motor in an electric drive of a vehicle.

8. The electric machine of claim 1, wherein the cooling assembly includes a sump configured to collect the coolant.

9. The electric machine of claim 8, further comprising a pump configured to receive coolant from the sump, wherein the pump is incorporated within the electric machine.

10. A method for operating a cooling assembly in an electric machine, comprising:
spraying a coolant from a spray ring toward a plurality of stator hairpin end windings;
wherein the electric machine includes:
a cooling assembly that includes the spray ring that is directly coupled to an axial face of a stator core, wherein the spray ring includes:
a first section that extends down the axial face of the stator core; and
a second section that extends axially away from the stator core;
wherein the second section includes an interior surface with a step that alters coolant flow;
wherein the step is positioned axially inward from a plurality of tips of the plurality of hairpin end windings;
wherein the spray ring is directly adhesively bonded to a stack of stator laminations;
wherein the second section is mated with a recess in a housing; and
wherein the housing includes a coolant compartment that is positioned radially outward from the step.

11. The method of claim 10, further comprising flowing coolant through a passage that traverses the stator core.

12. An electric motor, comprising:
a stator including a plurality of hairpin end windings and a stator core; and
a cooling assembly including a spray ring that is directly coupled to an axial face of the stator core, wherein the spray ring is configured to spray oil at the plurality of end windings and includes:
a first section that extends down the axial face of the stator core; and
a second section that extends axially away from the stator core;
wherein the second section includes an interior surface with a step that alters coolant flow;
wherein the step is positioned axially inward from a plurality of tips of the plurality of hairpin end windings;
wherein the spray ring is directly adhesively bonded to the stator core;

wherein the second section is mated with a recess in a housing; and wherein the housing includes a coolant compartment that is positioned radially outward from the step.

13. The electric motor of claim 12, wherein the spray ring includes a third section that extends axially away from the stator core at an inner diameter of the spray ring.

14. The electric motor of claim 12, wherein the spray ring is adhesively bonded to the stator core.

15. The electric motor of claim 12, wherein a portion of the second section of the spray ring is incorporated into a recess of a housing.

16. The electric motor of claim 12, wherein an interface between the spray ring and the stator core does not include an O-ring seal.

* * * * *